US008482778B2

(12) United States Patent
Towata

(10) Patent No.: US 8,482,778 B2
(45) Date of Patent: Jul. 9, 2013

(54) PRINT INTERMEDIARY SERVER AND PRINT INTERMEDIARY METHOD

(75) Inventor: Hiroaki Towata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 194 days.

(21) Appl. No.: 12/905,760

(22) Filed: Oct. 15, 2010

(65) Prior Publication Data

US 2011/0090535 A1 Apr. 21, 2011

(30) Foreign Application Priority Data

Oct. 19, 2009 (JP) ................................. 2009-240867

(51) Int. Cl.
*G06F 3/12* (2006.01)
(52) U.S. Cl.
USPC ........................................................ 358/1.15
(58) Field of Classification Search
None
See application file for complete search history.

(56) References Cited

U.S. PATENT DOCUMENTS

2003/0007175 A1 1/2003 Tsuda et al.
2008/0115207 A1* 5/2008 Go .................................. 726/17

FOREIGN PATENT DOCUMENTS

JP 2003-022165 A 1/2003

* cited by examiner

*Primary Examiner* — Marivelisse Santiago Cordero
*Assistant Examiner* — Mesfin Getaneh
(74) *Attorney, Agent, or Firm* — Canon USA Inc IP Division

(57) ABSTRACT

A print intermediary server capable of communicating with a web application server and a printing apparatus via the Internet manages information of one or more printing apparatuses, searches information of a printing apparatus requested by the web application server out of the information of one or more printing apparatuses to generate a response to the web application server, associates information indicating a storage location of print data whose printing has been requested by the web application server and information indicating a printing apparatus which has been requested to perform printing, stores the associated information as a print job, extracts, in response to a print job request from the printing apparatus, a print job associated with the printing apparatus which has made the print job request out of the stored print jobs, and generates a print job response to be transmitted to the printing apparatus.

7 Claims, 16 Drawing Sheets

FIG.5

| PRINTING APPARATUS ID | COUNTRY | REGION | COLOR/ MONOCHROME | TWO-SIDED/ ONE-SIDED | PRINTING APPARATUS KEY |
|---|---|---|---|---|---|
| XYZ-008 | JAPAN | TOKYO | Color | TWO-SIDED | XXXXXXX |
| ABC-019 | USA | New York | BW | TWO-SIDED | YYYYYYY |
| PQR-020 | JAPAN | KYOTO | Color | ONE-SIDED | ZZZZZZZ |

| PRINTING APPARATUS ID | PRINT DATA URI | |
|---|---|---|
| XYZ-008 | ¥¥test¥print¥document1.pdf | ~511 |
| ABC-019 | ¥¥sample¥print¥doc1.pdf | ~512 |
| ABC-019 | ¥¥sample¥print¥doc2.pdf | ~513 |

| PRINTING APPARATUS ID | WEB USER ID | WEB USER PASSWORD | PRINT DATA URI | |
|---|---|---|---|---|
| XYZ-008 | ABC | XXXXXXXX | ¥¥test¥print¥document1.pdf | ~521 |
| ABC-019 | XYZ | XXXXXXXX | ¥¥sample¥print¥doc1.pdf | ~522 |
| ABC-019 | XYZ | XXXXXXXX | ¥¥sample¥print¥doc2.pdf | ~523 |

| PRINTING APPARATUS ID | WEB USER ID | PRINTING APPARATUS USER PASSWORD | PRINT DATA URI | |
|---|---|---|---|---|
| XYZ-008 | AAA | XXXXXXXX | ¥¥test¥print¥document1.pdf | ~531 |
| ABC-019 | BBB | XXXXXXXX | ¥¥sample¥print¥doc1.pdf | ~532 |
| ABC-019 | CCC | XXXXXXXX | ¥¥sample¥print¥doc2.pdf | ~533 |

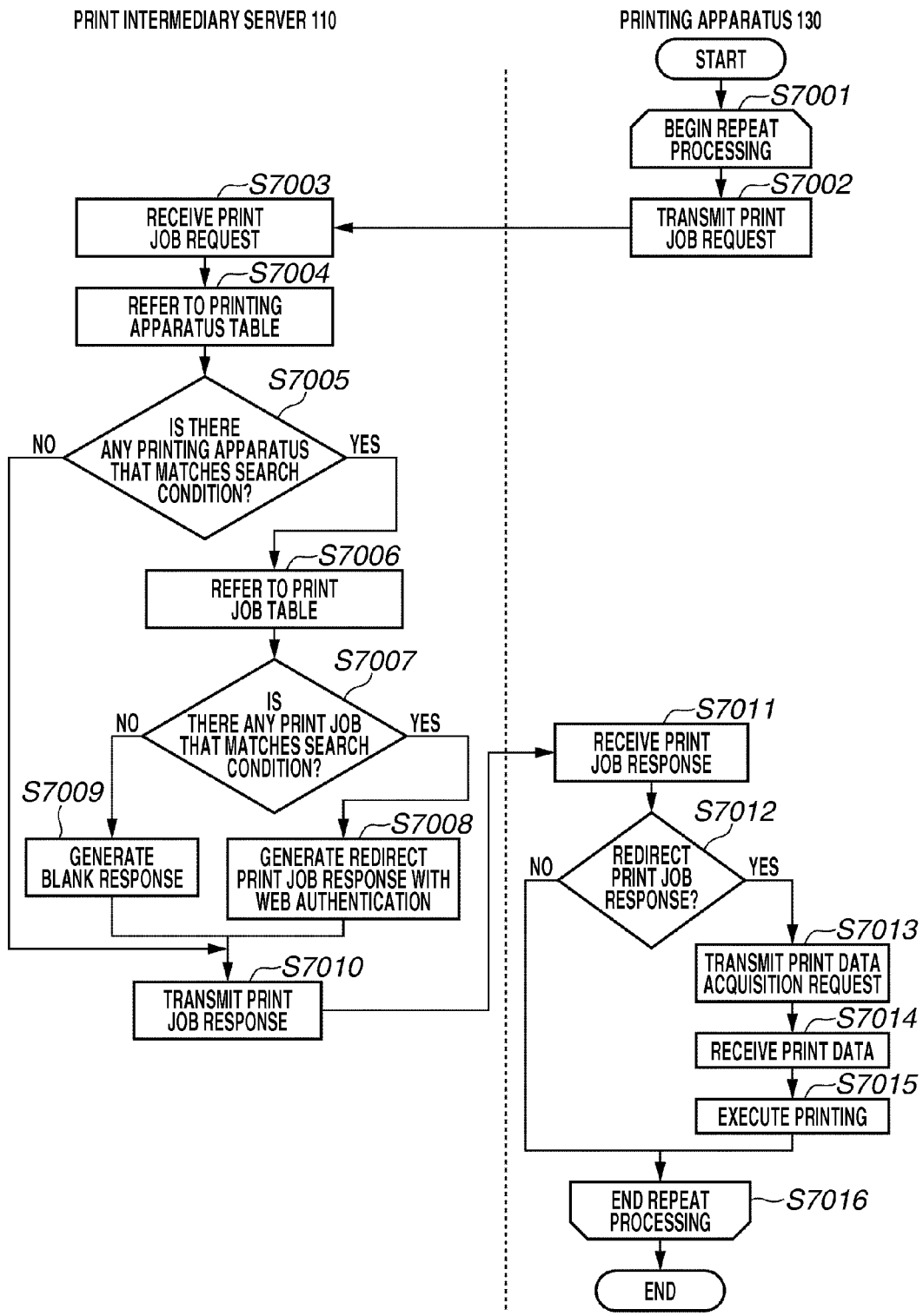

PRINT INTERMEDIARY SERVER AND PRINT INTERMEDIARY METHOD

BACKGROUND OF THE INVENTION

1. Field of the Invention

The present invention relates to a print intermediary server useful for mediating a printing instruction.

2. Description of the Related Art

In recent years, web application has become popular. A web application is an application that is provided by a web application server and accessed via a web browser of a client PC. When the web application is used, installation of applications in the client PC becomes unnecessary. The web application includes an application used for generating a document, editing the document, and storing the generated document in a storage of a web application server.

Conventionally, certain procedures have been necessary in printing a document, which has been generated using such an application, by a printing apparatus. First, a user generates and edits a document using a web application, and stores the document in a web application server. Then, via a web browser of a printing apparatus, the user downloads the document from the web application server to a storage of the printing apparatus. Lastly, by using an operation unit of the printing apparatus, the user instructs the printing apparatus to print the document stored in the storage. This type of printing performed according to the above-described procedures is called PULL type printing. This is because the download of the document originates from the printing apparatus when the printing is performed.

On the other hand, there is a demand for seamless operation using web application from the generation of a document to the printing of the document by a printing apparatus. This type of printing is called PUSH type printing. This is because a printing instruction is externally given to the printing apparatus. However, since the printing apparatus is protected by a firewall for security reasons, it does not accept the printing instruction according to the PUSH type printing given by the web application server via the Internet. Thus, methods for realizing the PUSH type printing via the Internet are being discussed.

Among such methods, there is a printing method according to which the printing apparatus sends a message to a web application server at regular intervals asking whether a print job exists. If a print job exists, the printing apparatus downloads the print data and performs printing (e.g., Japanese Patent Application Laid-Open No. 2003-022165). This print method is called printing using polling.

However, according to the print method using polling, if a printing instruction is given by various web application servers, the printing apparatus needs to perform polling of a plurality of web application servers. If the printing apparatus performs polling of a plurality of web application servers, the load of the network of the printing apparatus increases. Further, setting of the web application servers necessary in the polling will be complicated.

SUMMARY OF THE INVENTION

According to an aspect of the present invention, a print intermediary server capable of communicating with a web application server and a printing apparatus via the Internet includes a management unit configured to manage information of one or more printing apparatuses, a response unit configured to search information of a printing apparatus requested by the web application server out of the information of one or more printing apparatuses managed by the management unit and to generate a response to the web application server, a storage unit configured to associate information indicating a storage location of print data whose printing has been requested by the web application server and information indicating a printing apparatus which has been requested to perform printing, and to store the associated information as a print job, and a generation unit configured to extract, in response to a print job request from the printing apparatus, a print job associated with the printing apparatus which has made the print job request out of the print jobs stored in the storage unit, and to generate a print job response to be transmitted to the printing apparatus.

According to an exemplary embodiment of the present invention, since the print intermediary server manages printing instructions transmitted from the web application server, the printing apparatus does not need to access many servers in making the inquiry regarding printing. Thus, the load of the printing apparatus capable of the PUSH type printing can be reduced. Further, complicated setting used for the polling will be unnecessary.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates a printing apparatus table of the print intermediary server.

FIG. 6A illustrates a print job table of the print intermediary server. FIG. 6B illustrates a print job table with web authentication of the print intermediary server. FIG. 6C illustrates a print job table with printing apparatus authentication of the print intermediary server.

FIG. 16 illustrates a transmission flow of a redirect response to a URI generated by the print intermediary server as a print job response sent from the print intermediary server to the printing apparatus.

DESCRIPTION OF THE EMBODIMENTS

Various exemplary embodiments, features, and aspects of the invention will be described in detail below with reference to the drawings.

Figure 1:
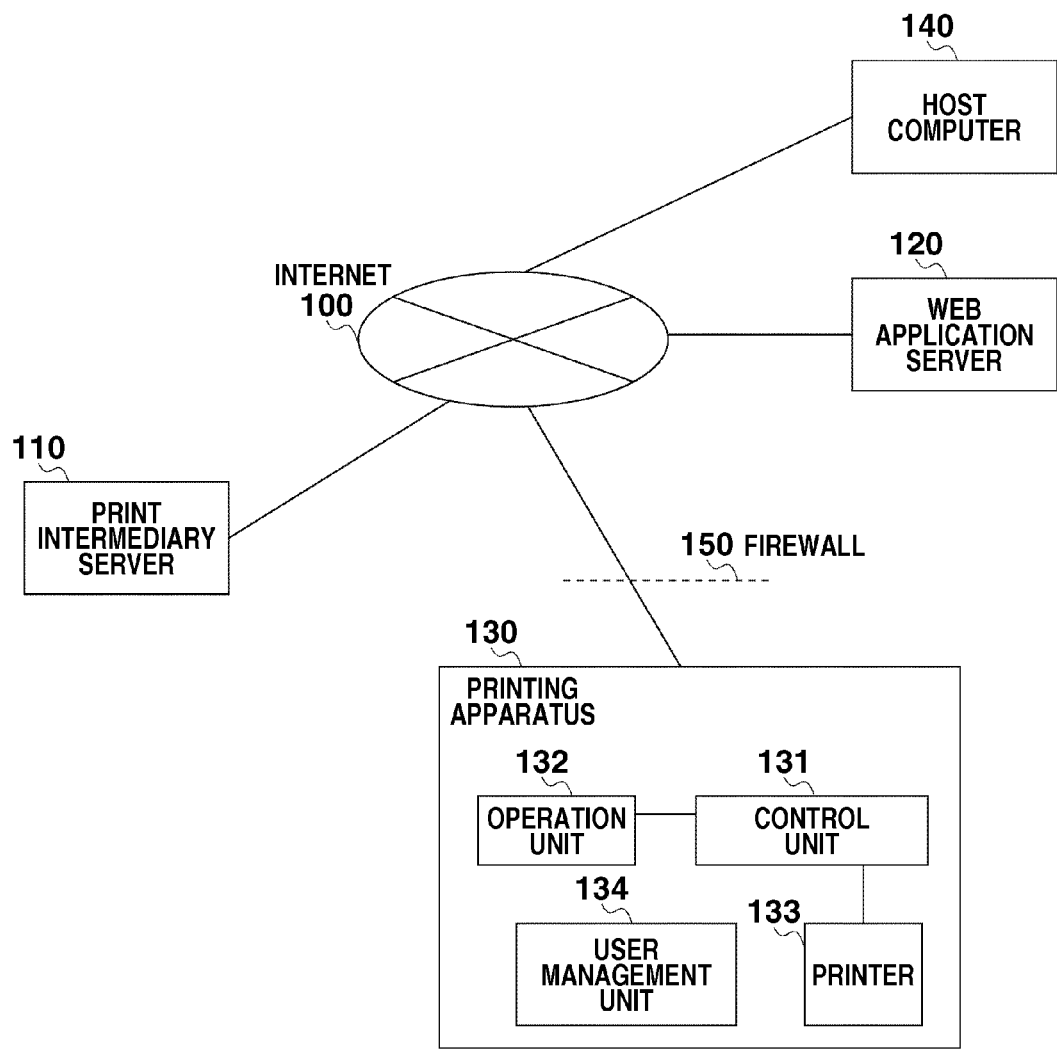
FIG. 1 illustrates a configuration of a system including a print intermediary server.

FIG. 1 is a block diagram illustrating an overall configuration of a system including a print intermediary server 110 according to a first exemplary embodiment of the present invention. A group of software processes is operating on the print intermediary server 110. The group of software processes is used for mediating a printing instruction between a web application server 120 and a printing apparatus 130. The print intermediary server 110 is connected to the Internet 100. A group of software processes is operating on the web application server 120. The group of software processes is used for providing functions such as a document generation function using a browser 141 (see FIG. 4) of a host computer 140 described below. The web application server 120 is also connected to the Internet 100.

The printing apparatus 130 is a multifunction peripheral (MFP) that can input/output and transmit/receive an image and perform various types of image processing. The printing apparatus 130 includes the printer 133 being an image output device, a control unit 131, and an operation unit 132 being a user interface. The printer 133 and the operation unit 132 are connected to the control unit 131. The control unit 131 controls the printer 133 and the operation unit 132. The control unit 131 is connected to the Internet 100.

The host computer 140 includes the browser 141. The host computer 140 can receive services from the web application server 120 via HTTP (hypertext transfer protocol). The host computer 140 is, for example, a personal computer (PC), a personal digital assistant (PDA), or a cellular phone. The host computer 140 is connected to the Internet 100.

A firewall 150 is provided to limit access to the printing apparatus 130 from an external apparatus via the Internet 100 for security reasons. Thus, the print intermediary server 110 can communicate with the web application server 120 via the Internet, and also communicate with the printing apparatus 130 via the Internet through the firewall.

Figure 2:
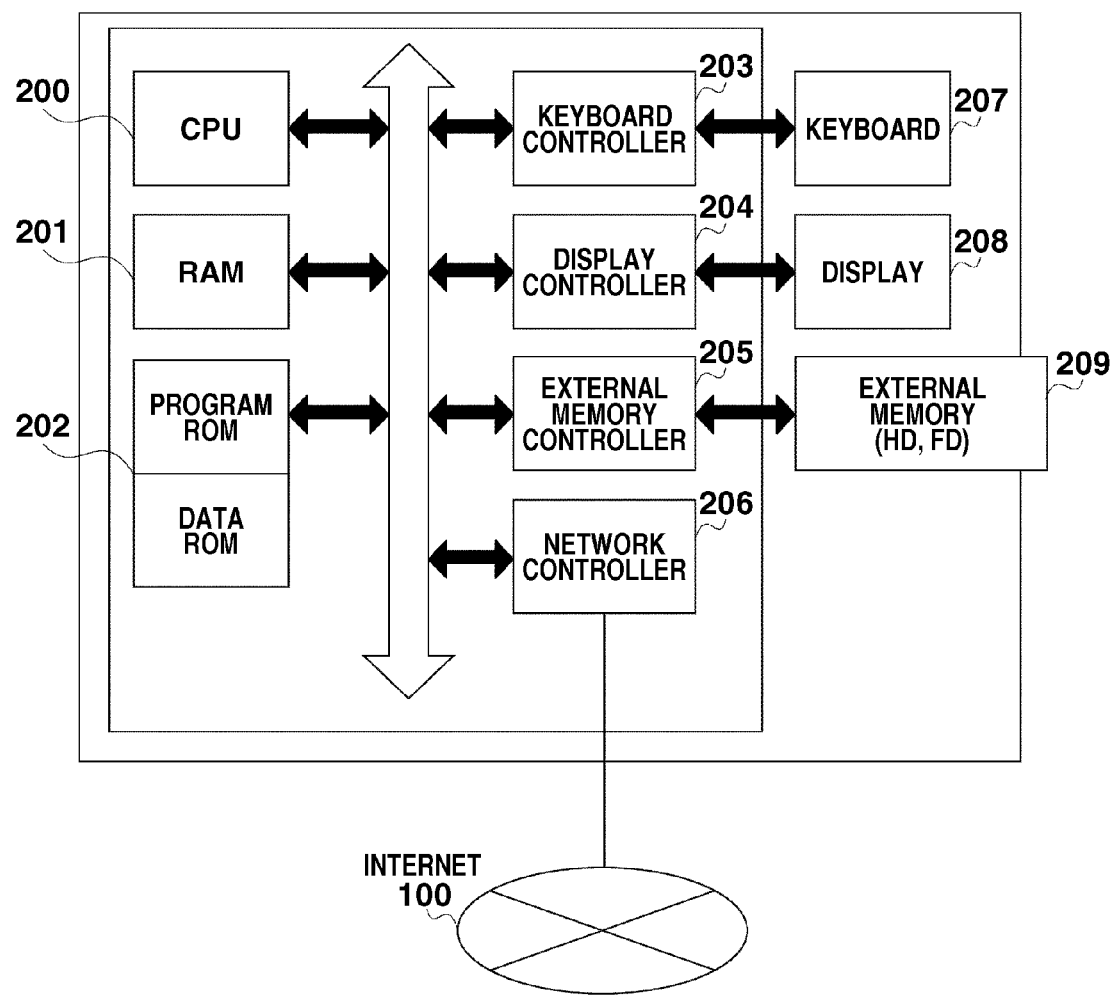
FIG. 2 illustrates a hardware configuration of a host computer, the print intermediary server, and a web application server.

FIG. 2 illustrates a hardware configuration of the host computer 140, the print intermediary server 110, and the web application server 120, each of which constitute the computer system of the embodiments of the present invention. The hardware configuration illustrated in FIG. 2 corresponds to a hardware configuration of a general information processing apparatus. A hardware configuration of a general information processing apparatus is applied to the host computer 140, the print intermediary server 110, and the web application server 120 of the present embodiment.

In FIG. 2, a central processing unit (CPU) 200 executes an operating system (OS) or an application program stored in a program read-only memory (ROM) of a ROM 202 or stored in an external memory 209 and loaded into a random access memory (RAM) 201. Processing of the flowcharts described below is executed by the CPU 200. The RAM 201 functions as a main memory and a work area of the CPU 200. A keyboard controller 203 controls key input by a user using a keyboard 207 or a pointing device (not shown). A display controller 204 controls display of a display 208. An external memory controller 205 controls access to data stored in the external memory 209 (e.g., a hard disk (HD) or a flexible disk (FD)) that stores various types of data. A network controller 206 is connected to the Internet 100 and executes control processing of communication with other apparatuses connected to the Internet 100.

Figure 3:
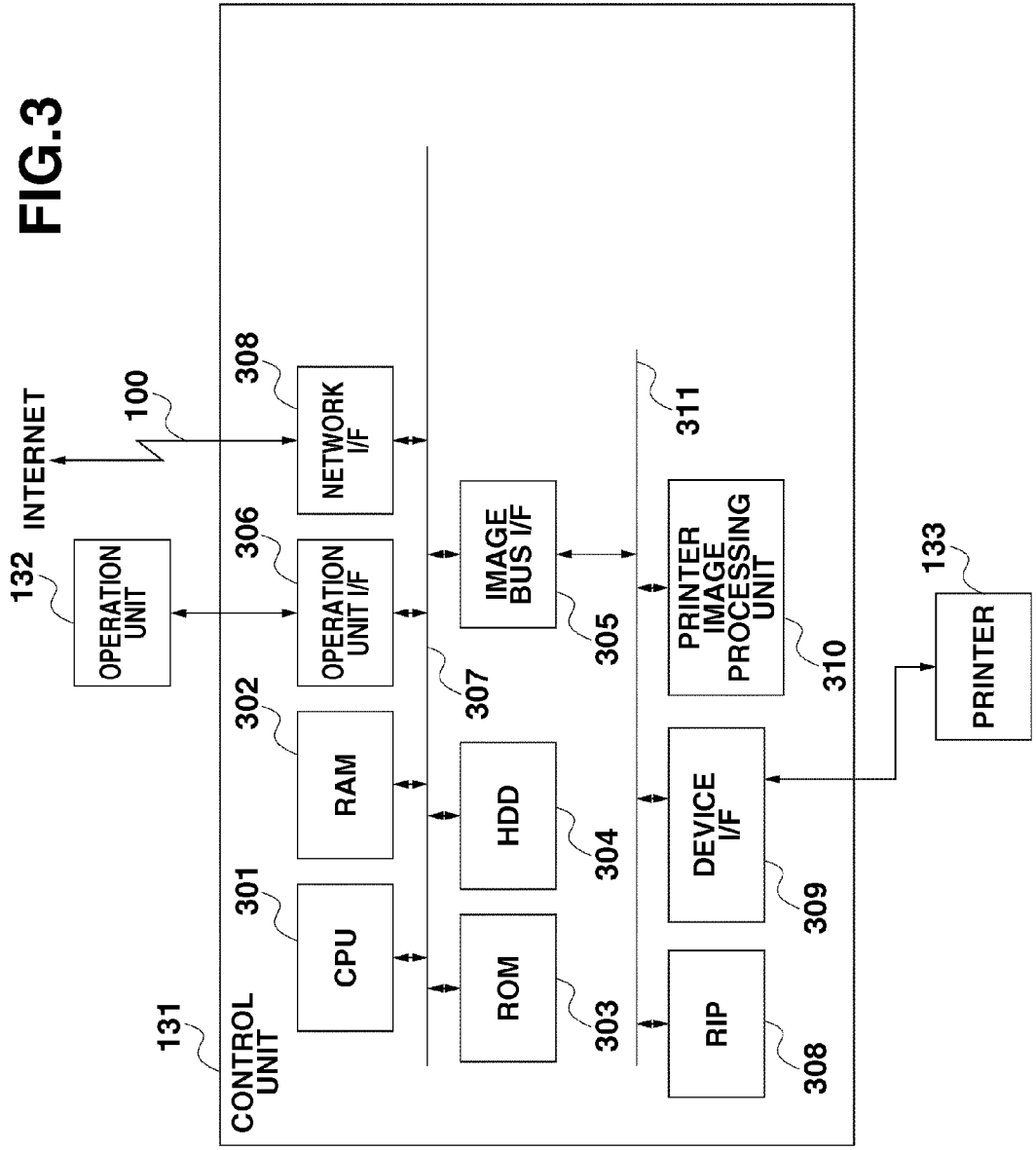
FIG. 3 illustrates a hardware configuration of a printing apparatus.

Next, the configuration of the printing apparatus 130 will be described with reference to FIG. 3. FIG. 3 is a block diagram illustrating detailed configuration of the printing apparatus 130 illustrated in FIG. 1.

As illustrated in FIG. 3, the printing apparatus 130 includes the control unit 131, which controls the overall operation of the apparatus. The control unit 131 controls the printer 133 being an image output device. The control unit 131 is connected to a LAN or a public line and receives/transmits image information or device information via the LAN or the public line. The control unit 131 includes a CPU 301.

The CPU 301 is connected to a RAM 302, a ROM 303, a HDD (hard disk device) 304, an image bus I/F 305, an operation unit I/F 306, and a network I/F 308 via a system bus 307. The RAM 302 serves as a work area for the CPU 301. Further, the RAM 302 serves as an image memory used for temporarily storing image data. The ROM 303 is a boot ROM. A boot program of the system is stored in the ROM 303. System software and image data is stored in the HDD 304. The operation unit I/F 306 is an interface which is used when data is input in or output from the operation unit 132. For example, it is used when image data to be displayed on the operation unit 132 is input in the operation unit 132 or when information input by the user using the operation unit 132 is transmitted to the CPU 301. The network I/F 308 is connected to the Internet 100 via the firewall 150, and used for transmitting/receiving information to and from the Internet 100.

The image bus I/F 305 is a bus bridge that connects the system bus 307 and an image bus 311, which transfers image data at a high speed, and converts a data structure. A raster image processor (RIP) 308, a device I/F 309, and a printer image processing unit 310 are connected to the image bus 311. The RIP 308 rasterizes the page description language (PDL) code received from the network into a bitmapped image. The device I/F 309 connects the printer 133 and the control unit 131, and performs synchronous/asynchronous conversion of the image data. The printer image processing unit 310 performs correction and resolution conversion of the image data to be output.

Figure 4:
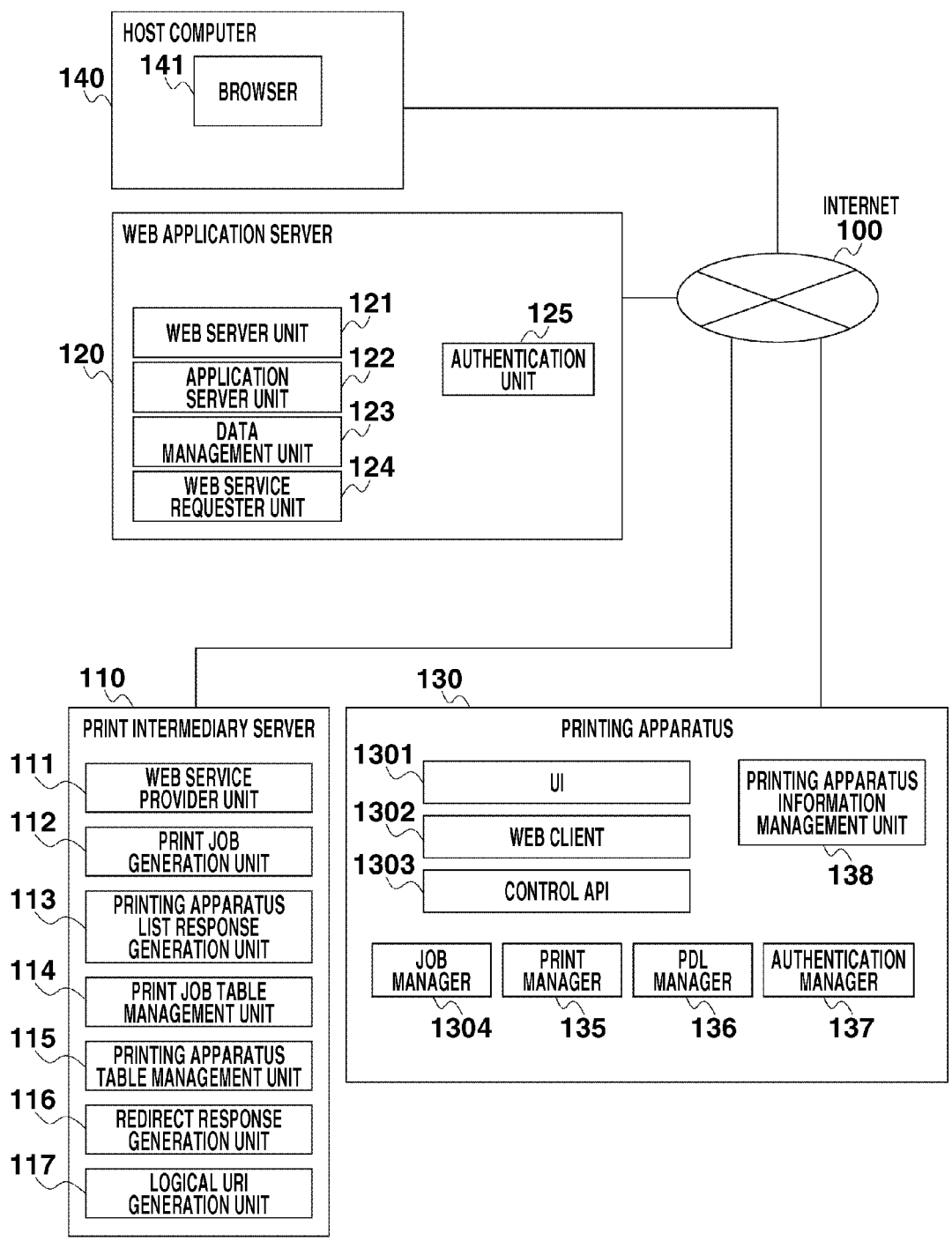
FIG. 4 illustrates a software configuration of the print intermediary server, the web application server, the printing apparatus, and the host computer.

Next, software configurations of the print intermediary server 110, the web application server 120, the printing apparatus 130, and the host computer 140 will be described with reference to FIG. 4.

The print intermediary server 110 includes a web service provider unit 111, a print job response generation unit 112, a printing apparatus list response generation unit 113, a print job table management unit 114, a printing apparatus table management unit 115, a redirect response generation unit 116, and a logical URI generation unit 117. These modules exist as program files stored in the external memory 209 of the print intermediary server 110. An OS or a module using the above-described module loads a program file into the RAM 201 and then the CPU 200 executes the program file.

The web service provider unit 111 gives a web service response to a web service request sent from the web application server 120 or the printing apparatus 130. The print job response generation unit 112 generates a print job response in response to a print job request sent from the printing apparatus 130. The printing apparatus list response generation unit 113 generates a printing apparatus list response to a printing apparatus list request sent from the web application server 120.

The print job table management unit 114 manages a print job table 510, a print job table 520 with web authentication, and a print job table 530 with printing apparatus authentication. These tables are used for registering print jobs sent from the web application server 120. The printing apparatus table management unit 115 manages printing apparatus information sent from the printing apparatus 130 according to a printing apparatus registration request.

The redirect response generation unit 116 generates a redirect response including a print data URI in response to a print job request sent from the printing apparatus 130. The logical URI generation unit 117 generates a logical URI which is a print data URI with an additional web user ID and a web user password.

The web application server 120 includes a web server unit 121, an application server unit 122, a data management unit 123, a web service requester unit 124, and an authentication unit 125. These modules exist as program files stored in the external memory 209 of the web application server 120. An OS or a module using the above-described module loads a program file into the RAM 201 and then the CPU 200 executes the program file. The web server unit 121 accepts an HTTP request sent from the browser 141 of the host computer 140 via the Internet 100 and returns an HTTP response to the request to the host computer 140.

The application server unit 122 is called by the web server unit 121 according to the HTTP request and executes processing. According to the result of the processing, the application server unit 122 returns a dynamically generated HTML to the web server unit 121. Further, the application server unit 122 causes the web service requester unit 124 to transmit a web service request to an external service, for example, the print intermediary server 110, via the Internet 100.

The data management unit 123 performs management of data that needs to be maintained. The web service requester unit 124 transmits a web service request to the web service provider unit 111 of the print intermediary server 110 and receives a response. When the authentication unit 125 receives a web user ID and a web user password, it returns an authentication result.

The printing apparatus 130 includes a user interface (UI) 1301, a web client 1302, a control application programming interface (API) 1303, a job manager 1304, a print manager 135, a PDL manager 136, and an authentication manager 137. These modules exist as program files stored in the HDD 304 of the printing apparatus 130. An OS or a module using the above-described module loads a program file into the RAM 302 and then the CPU 301 executes the program file.

When the user performs various operations and makes setting of the printing apparatus 130, the UI 1301 of the printing apparatus 130 mediates between the apparatus and the user operation. According to an operation of an operator, the UI 1301 transfers information that has been input to the modules described below and requests the modules to process the information or sets data. The web client 1302 transmits a print job request to the print intermediary server 110. The control API 1303 provides a module such as the web client 1302 with an interface, for example, used for communication with a module such as the job manager 1304 described below. According to the control API 1303, independency of the modules is enhanced and the function of each module is more diversely used.

The job manager 1304 interprets various types of processing instructed by each of the above-described modules via the control API 1303 and gives instructions to the modules described below. Further, the job manager 1304 centralizes management of hardware processing executed by the printing apparatus 130. The print manager 135 manages/controls the print processing instructed by the job manager 1304.

The PDL manager 136 performs PDL conversion of document data instructed by the job manager 1304. The authentication manager 137 authenticates the user that uses the printing apparatus 130. The authentication manager 137 manages a printing apparatus user ID and a printing apparatus user password. On receiving a printing apparatus user ID and a printing apparatus user password from the web client 1302, the authentication manager 137 determines whether a printing apparatus user ID and a printing apparatus user password that match the received ID and password exist in the ID and the password managed by the authentication manager 137.

A printing apparatus information management unit 138 manages a printing apparatus ID of the printing apparatus 130, location information of the printing apparatus, and printing capability information of the printing apparatus 130 such as color/monochromatic printing and two-sided/one-sided printing.

The host computer 140 includes the browser 141. The browser 141 exists as a program file stored in the external memory 209 of the host computer 140. An OS or a module using the above-described module loads a program file into the RAM 201 and then the CPU 200 executes the program file. The browser 141 is displayed on the display 208 and receives an instruction from the user using the keyboard 207 or a pointing device (not shown). Further, the browser 141 is connected to the web application server 120 using HTTP via the Internet 100 and receives a service.

Next, a printing apparatus table 400 managed by the printing apparatus table management unit 115 of the print intermediary server 110 will be described with reference to FIG. 5.

The printing apparatus table 400 is a data table that contains the printing apparatus ID of the printing apparatus 130, the location information of the printing apparatus, the capability information of the printing apparatus 130 such as color/monochromatic printing and two-sided/one-sided printing, and a printing apparatus key of the printing apparatus 130. The installation location information of the printing apparatus and the capability information of the printing apparatus 130 contained in the printing apparatus table 400 are used as search information when the user selects a desired printing apparatus using the web application provided by the web application server 120. When the printing apparatus 130 sends a print job request to the print intermediary server 110, it uses the printing apparatus key as a proof of authenticity. The printing apparatus key is a character string arbitrarily specified by the user.

Next, the print job table 510 managed by the print job table management unit 114 of the print intermediary server 110 will be described with reference to FIG. 6A. The print job table 510 is generated by the web service provider unit 111 of the print intermediary server 110 calling the print job table management unit 114 with respect to a print request sent from the web application server 120. The printing apparatus ID is an ID selected by the user on the host computer 140. The print data URI indicates a storage location of the print data on the web application server 120.

Next, the print job table 520 with web authentication managed by the print job table management unit 114 of the print intermediary server 110 will be described with reference to FIG. 6B. Since the printing apparatus ID and the print data URI of the print job table 520 are similar to those of the print job table 510, their descriptions are not repeated. A web user ID and a web user password are used when the web application server 120 is accessed. By using the above-described ID and password, the printing apparatus 130 can acquire the print data on the web application server 120.

Next, the print job table 530 with printing apparatus authentication managed by the print job table management unit 114 of the print intermediary server 110 will be described with reference to FIG. 6C. Since the printing apparatus ID and the print data URI are similar to those of the print job table 510, their descriptions are not repeated. A printing apparatus user ID is used when a user executes a printing operation using the printing apparatus 130. A printing apparatus user password is used when a user accesses the web application server 120. By using the above-described ID and password, only the user who is managed by the printing apparatus 130 can execute the printing operation.

Next, the first exemplary embodiment of the present invention will be described in three parts: a first, a second, and a third processing flow. In the first processing flow, the user registers the information of the printing apparatus 130 in the print intermediary server 110 using the operation unit 132 of the printing apparatus 130. The registered information is used when the user selects a printing apparatus 130 to be used for printing from the web application server 120. Next, in the second processing flow, the web application server 120 acquires a list of printing apparatuses from the print intermediary server 110, and then transmits a request that instructs a printing apparatus 130 to perform printing to the print intermediary server 110.

In the second processing flow, the web application server 120 can register a print request with respect to the desired printing apparatus 130 in the print intermediary server 110. In the third processing flow, the print intermediary server 110 generates a print job response in response to the print job request sent from the printing apparatus 130 and transmits the generated print job response to the printing apparatus 130. The second processing flow is not in synchronization with the third processing flow. The print job request, according to which the third processing flow is started, is sent out by the printing apparatus 130 at a predetermined interval. The processing flow will be described in detail below.

Now, the first processing flow according to the present embodiment will be described with reference to FIG. 5 and the flowchart in FIG. 9. According to the first processing flow, the information of the printing apparatus 130 is registered in the print intermediary server 110. The first processing flow is executed only once when the printing apparatus 130 is set so that the print intermediary server 110 can be used.

Next, data of the printing apparatus table 400 managed by the printing apparatus table management unit 115 according to the present embodiment will be described with reference to FIG. 5.

The row of data 401 indicates that a printing apparatus having "XYZ-008" as the printing apparatus ID, "JAPAN" as the country, "TOKYO" as the region, "color" as the color/monochromatic printing, "two-sided" as the two-sided/one-sided printing, and "XXXXXXXX" as the printing apparatus key is registered in the printing apparatus table 400 of the print intermediary server 110.

The row of data 402 indicates that a printing apparatus having "ABC-019" as the printing apparatus ID, "USA" as the country, "New York" as the region, "BW" as the color/monochromatic printing, "two-sided" as the two-sided/one-sided printing, and "YYYYYYYY" as the printing apparatus key is registered in the printing apparatus table 400 of the print intermediary server 110.

The row of data 403 indicates that a printing apparatus having "PQR-020" as the printing apparatus ID, "JAPAN" as the country, "KYOTO" as the region, "color" as the color/monochromatic printing, "one-sided" as the two-sided/one-sided printing, and "ZZZZZZZZ" as the printing apparatus key is registered in the printing apparatus table 400 of the print intermediary server 110.

According to the first flow, the above-described information can be registered in the printing apparatus table 400. Further, the above-described information can be used as search information when the user selects the printing apparatus 130 using the application on the web application server 120. Further, each item of the printing apparatus table 400 of the present embodiment is not limited to the above-described example and more information of the printing apparatus 130 can be contained in the table.

Figure 7:
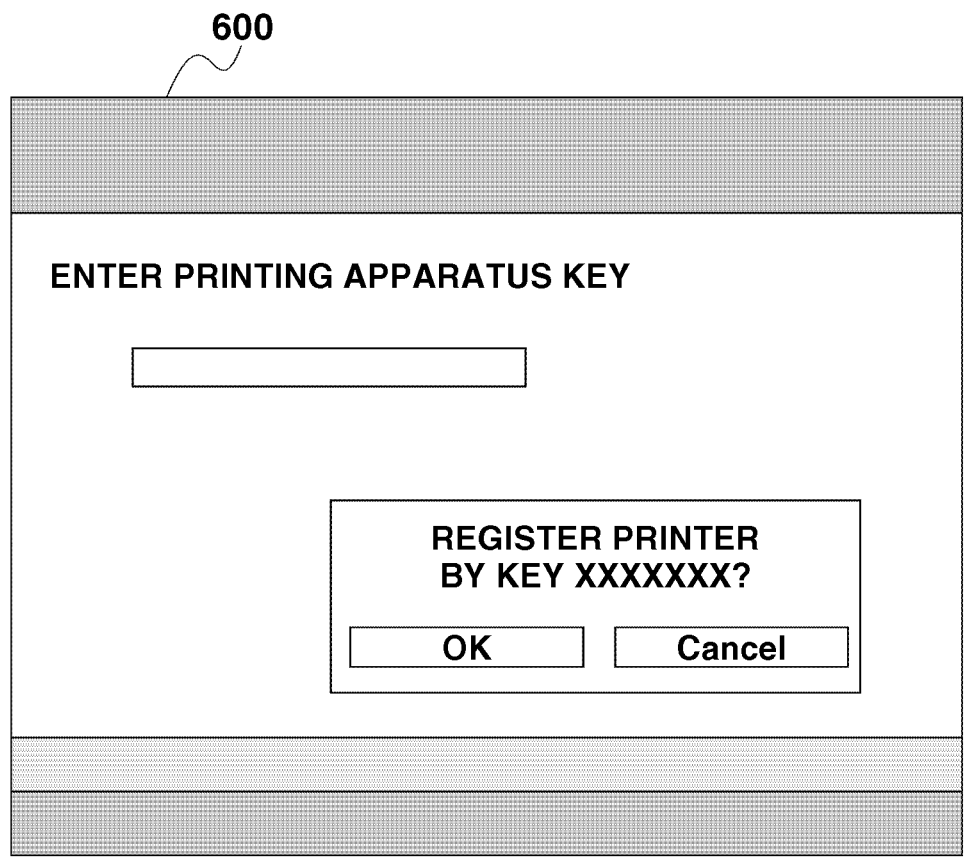
FIG. 7 illustrates a printing apparatus key input screen of the printing apparatus.
Figure 9:
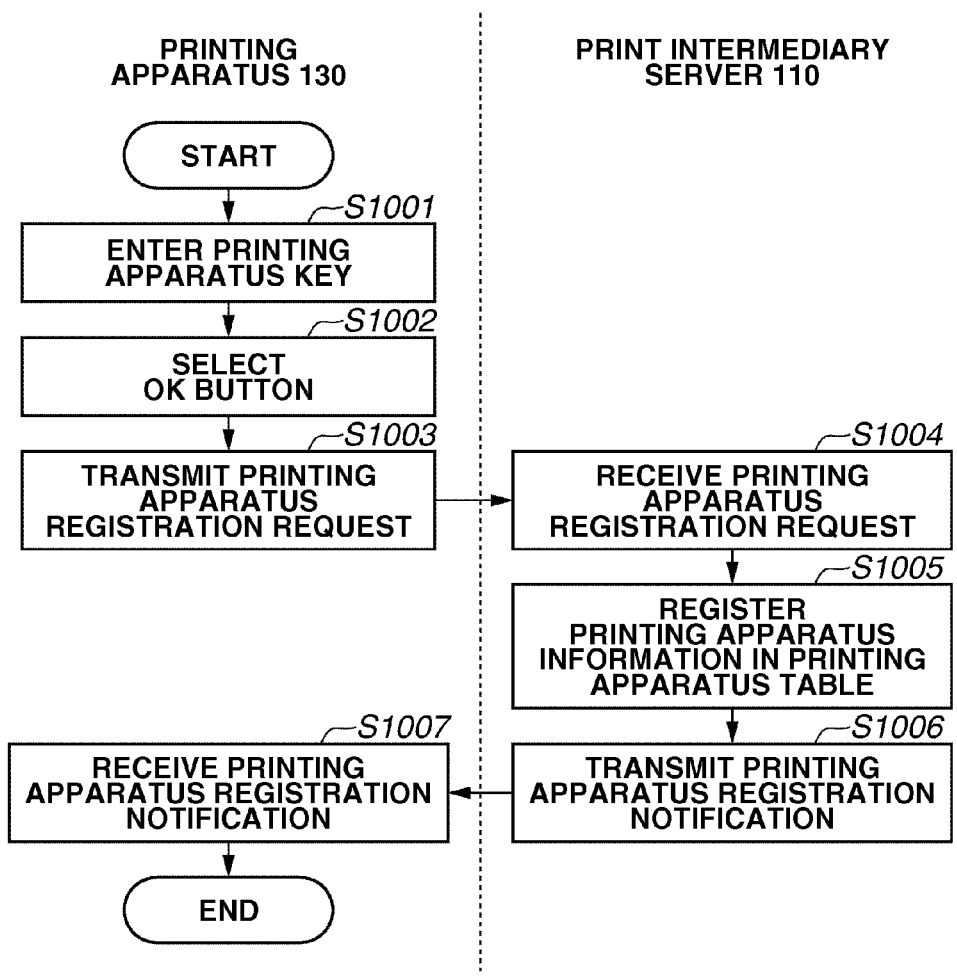
FIG. 9 illustrates a registration flow of information of the printing apparatus in the print intermediary server.

In step S1001 in FIG. 9, the user enters a printing apparatus key into the printing apparatus key input screen (see FIG. 7) displayed on the UI 1301 of the printing apparatus 130 using the operation unit 132. The form, the area configuration, and the control regarding the user interface illustrated in FIG. 7 are not limited and the user interface can be in any form so long as it can realize the necessary functions.

In step S1002, the user selects an OK button 604. In step S1003, the web client 1302 of the printing apparatus 130 sends a printing apparatus registration request to the print intermediary server 110. The printing apparatus registration request includes the printing apparatus ID, location information of the printing apparatus, capability information of the printing apparatus, and the printing apparatus key. The printing apparatus registration request is transmitted according to, for example, SOAP (simple object access protocol).

In step S1004, the web service provider unit 111 of the print intermediary server 110 receives the printing apparatus registration request transmitted from the web client 1302 of the printing apparatus 130. In step S1005, the web service provider unit 111 of the print intermediary server 110 calls the printing apparatus table management unit 115. The printing apparatus table management unit 115 acquires information of the printing apparatus 130 from the printing apparatus registration request sent from the printing apparatus 130 and registers the acquired information in the printing apparatus table 400.

In step S1006, the web service provider unit 111 of the print intermediary server 110 sends a printing apparatus registration notification to the web client 1302 of the printing apparatus 130. In step S1007, the web client 1302 of the printing apparatus 130 receives the printing apparatus registration notification from the web service provider unit 111 of the print intermediary server 110. As described above, the information of the printing apparatus 130 is registered in the print intermediary server 110 according to the first flow.

Next, the second processing flow will be described with reference to the flowchart in FIG. 10 and the print job table in FIG. 6A. According to the second flow, the web application server 120 acquires the list of the printing apparatuses from the print intermediary server 110 and transmits a request for printing for the printing apparatus 130 to the print intermediary server 110. The second processing flow is started by the web application server 120 when a document is generated by the user using the web application server 120 and a print execution instruction is also given by the user on the browser 141.

Next, data contained in the print job table 510 managed by the print job table management unit 114 according to the present embodiment will be described with reference to FIG. 6A.

The row of data 511 indicates that a print job having "XYZ-008" as the printing apparatus ID and "¥¥test¥print¥document1.pdf" as the print data URI is registered in the print job table 510. The row of data 512 indicates that a print job having "ABC-019" as the printing apparatus ID and "¥¥sample¥print¥doc1.pdf" as the print data URI is registered in the print job table 510. The row of data 513 indicates that a print job having "ABC-019" as the printing apparatus ID and "¥¥sample¥print¥doc2.pdf" as the print data URI is registered in the print job table 510. Further, the above-described information is used when the print intermediary server 110 generates a response to the print job request sent from the printing apparatus 130.

Figure 10:
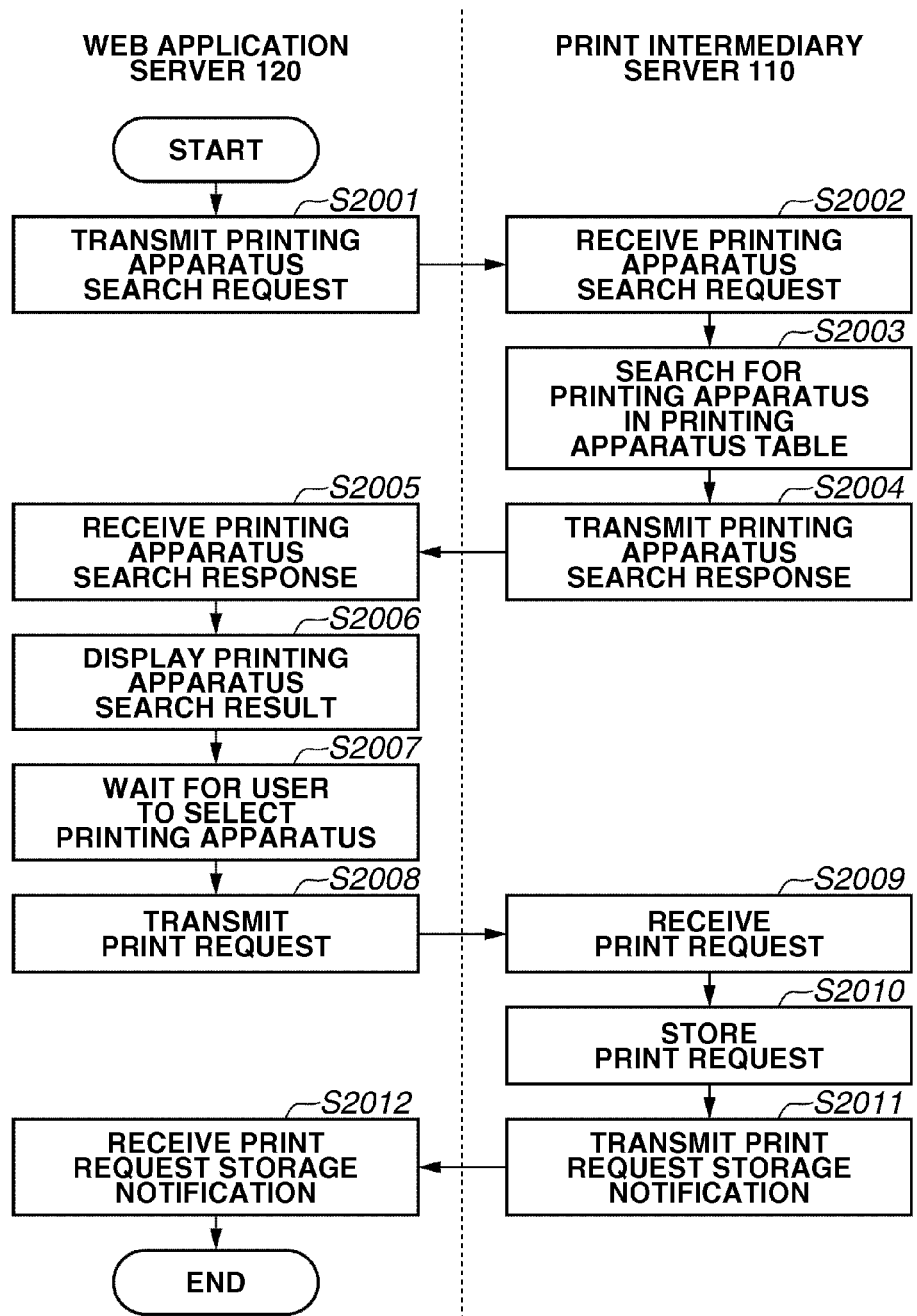
FIG. 10 illustrates a registration flow of a print request transmitted from the web application server to the print intermediary server.

The flowchart in FIG. 10 is started by the web application server 120 when a document is generated by the user using the web application server 120 and a print execution instruction is also given by the user on the browser 141.

In step S2001, the web service requester unit 124 of the web application server 120 transmits a printing apparatus search request to the web service provider unit 111 of the print intermediary server 110.

In step S2002, the web service provider unit 111 of the print intermediary server 110 receives the printing apparatus search request sent from the web service requester unit 124 of the web application server 120. The installation location and the capability information (e.g., color/monochromatic, two-sided/one-sided) of the printing apparatus are designated according to the printing apparatus search request sent from the web service requester unit 124. The web application server 120 uses the print intermediary server 110, for example, as a web service.

In step S2003, the web service provider unit 111 of the print intermediary server 110 calls the printing apparatus list response generation unit 113. The printing apparatus list response generation unit 113 searches for the attribute designated by the web application server 120 in the printing apparatus table 400 and extracts a printing apparatus 130 that matches the search condition.

In step S2004, the printing apparatus list response generation unit 113 of the print intermediary server 110 returns a printing apparatus search response to the web service provider unit 111. The web service provider unit 111 transmits the printing apparatus search response to the web application server 120. The printing apparatus search response is a list of IDs of the printing apparatus 130.

In step S2005, the web service requester unit 124 of the web application server 120 receives the printing apparatus search response transmitted from the print intermediary server 110. In step S2006, the web server unit 121 of the web application server 120 displays the printing apparatus search result in the browser 141 of the host computer 140.

In step S2007, the web application server 120 waits until the user selects a desired printing apparatus 130 in the browser 141 of the host computer 140. When a printing apparatus 130 is selected by the user, the processing proceeds to step S2008. In step S2008, the web service requester unit 124 of the web application server 120 transmits a print request to the web service provider unit 111 of the print intermediary server 110. The print request includes information such as a printing apparatus ID which is an ID of a printing apparatus that is to perform printing and print data URI that indicates a storage location of the print data. The communication of the print request is performed, for example, by SOAP.

In step S2009, the web service provider unit 111 of the print intermediary server 110 receives the print request from the web service requester unit 124 of the web application server 120. In step S2010, the web service provider unit 111 of the print intermediary server 110 calls the print job table management unit 114. Then, the print job table management unit 114 stores information of the print request as a print job in the print job table 510.

In step S2011, the print intermediary server 110 transmits a print request storage notification to the web application server 120. In step S2012, the web application server 120 receives the print request storage notification transmitted from the print intermediary server 110.

As described above, in the second flow, the web application server 120 acquires the list of the printing apparatuses from the print intermediary server 110, and a request for printing for the printing apparatus 130 is transmitted to the print intermediary server 110.

Next, the third processing flow will be described with reference to the flowchart in FIG. 11. In the third processing flow, the print intermediary server 110 generates a print job response in response to the print job request sent from the printing apparatus 130, and transmits the generated print job response to the printing apparatus 130. The third processing flow is repeated at a predetermined interval and is started when the power of the printing apparatus 130 is turned on.

In step S3001, the printing apparatus 130 repeats the processing performed in steps S3002 to S3016. In step S3002, the web client 1302 of the printing apparatus 130 transmits the print job request to the print intermediary server 110. The print job request includes information such as a printing apparatus ID and a printing apparatus key.

In step S3003, the print intermediary server 110 receives the print job request transmitted from the web client 1302 of the printing apparatus 130. In step S3004, the web service provider unit 111 of the print intermediary server 110 calls the printing apparatus table management unit 115. The printing apparatus table management unit 115 refers to the printing apparatus table 400.

In step S3005, the printing apparatus table management unit 115 of the print intermediary server 110 determines whether a combination of the printing apparatus ID and the printing apparatus key included in the print job request exists in the printing apparatus table 400. If a printing apparatus that satisfies the search condition exists (YES in step S3005), then the processing proceeds to step S3006. If such a printing apparatus does not exist (NO in step S3005), then the processing proceeds to step S3010.

In step S3006, the print job table management unit 114 of the print intermediary server 110 refers to the print job table 510 and searches for a print job that matches the printing apparatus ID included in the print job request. In step S3007, the print job table management unit 114 of the print intermediary server 110 determines whether a print job that matches the printing apparatus ID included in the print job request exists as a result of the search in step S3006. If a print job that corresponds to the printing apparatus ID exists (YES in step S3007), then the processing proceeds to step S3008. If such a print job does not exist (NO in step S3007), then the processing proceeds to step S3009.

In step S3008, the print job response generation unit 112 of the print intermediary server 110 generates a print job response. The print job response includes the print data URI. On the other hand, in step S3009, the print intermediary server 110 generates a blank response. The blank response does not include the print data URI.

In step S3010, the print intermediary server 110 transmits the print job response generated in step S3008 or S3009 in response to the print job request transmitted from the printing apparatus 130. The communication of the print job response is performed, for example, by SOAP. In step S3011, the web client 1302 of the printing apparatus 130 receives the print job response transmitted from the web service provider unit 111 of the print intermediary server 110.

In step S3012, the printing apparatus 130 determines whether a print data URI is included in the print job response. Whether a print data URI is included in the response is determined, for example, by acquiring information in the XML of the SOAP communication. If a print data URI is included in the print job response (YES in step S3012), then the processing proceeds to step S3013. If the print data URI is not included (NO in step S3012), then the processing proceeds to step S3016. In step S3013, the web client 1302 of the printing apparatus 130 reads the print data URI from the print job and then requests the web server unit 121 of the web application server 120 to download the print data from the print data URI.

In step S3014, the web client 1302 of the printing apparatus 130 receives the print data. The request for downloading the print data is performed according to, for example, an HTTP protocol Get request with respect to the print data URI.

Figure 8:
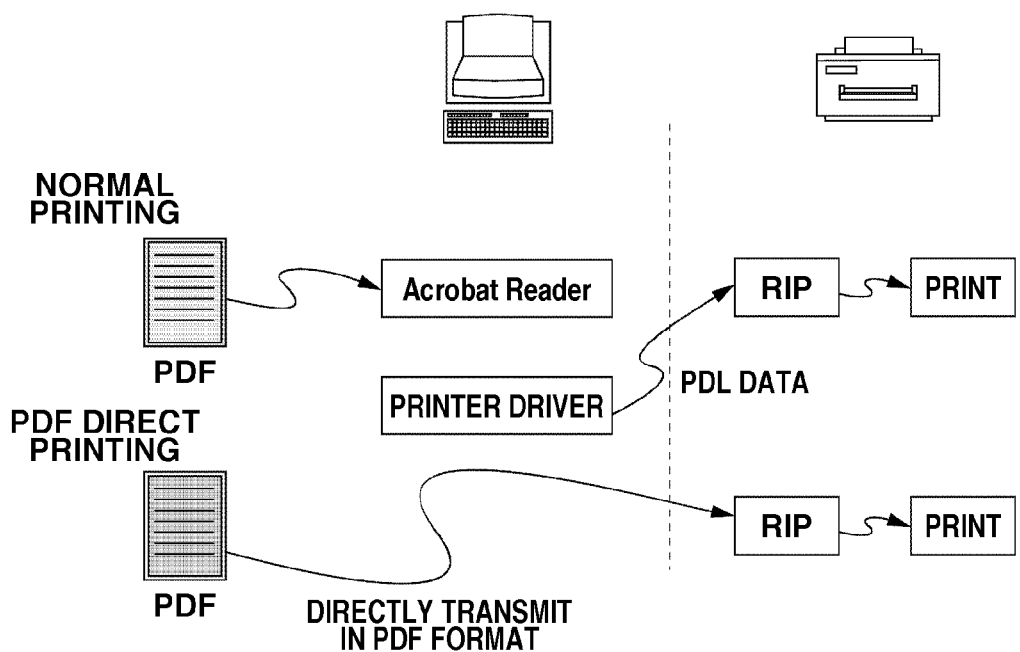
FIG. 8 illustrates PDF direct printing.

In step S3015, the print manager 135 of the printing apparatus 130 prints the downloaded document using, for example, PDF direct print. As illustrated in FIG. 8, the PDF direct print is a function which allows direct printing of a PDF document without using a printer driver. The printing apparatus 130 is not necessarily capable of PDF direct print. For example, after the control API 1303 of the printing apparatus 130 converts the document into a print format which can be printed by the PDL manager 136, the document can be printed using the RIP 308.

In step S3016, the processing returns to step S3001. As describe above, according to the third processing flow, in response to a print job request sent from the printing apparatus 130, if a print job for the printing apparatus 130 exists in the print job table, the print intermediary server 110 generates a print job response and responds to the printing apparatus.

As described above, according to the first, the second, and the third processing flow of the first exemplary embodiment, the print intermediary server 110 collectively manages the PUSH type printing instruction sent from the web application server 120 to the printing apparatus 130 so that the desired document can be printed. Thus, the printing apparatus 130 can determine one print intermediary server as a device for polling. Accordingly, the load of the printing apparatus 130 can be reduced. Further, complicated setting necessary in setting polling devices will be unnecessary.

Next, processing by the printing apparatus 130 for downloading print data from the web application server 120 after authentication is completed according to a second exemplary embodiment of the present invention will be described with reference to the flowcharts in FIGS. 10 and 11. In the following description, only the configurations different from those of the first exemplary embodiment will be described.

Data of the print job table 520 with web authentication managed by the print job table management unit 114 according to the present embodiment will be described with reference to FIG. 6B. The printing apparatus ID and the print data URI are similar to those described in the first exemplary embodiment. The row of data 521 indicates that a print job having "ABC" as the web user ID and "xxxxxxx" as the web user password is registered in the print job table 520 with web authentication. The row of data 522 indicates that a print job having "XYZ" as the web user ID and "xxxxxxx" as the web user password is registered in the print job table 520 with web authentication. The row of data 523 indicates that a print job having "XYZ" as the web user ID and "xxxxxxx" as the web user password is registered in the print job table 520 with web authentication. The above-described information can be registered in the print job table 520 with web authentication according to the processing flow described below.

Since the processes in steps S2001 to S2007 and steps S2011 to S2012 in FIG. 10 are similar to those of the first exemplary embodiment, their descriptions are not repeated.

In step S2008, the web service requester unit 124 of the web application server 120 calls the authentication unit 125 and acquires a web user ID and a web user password. Then, the web service requester unit 124 transmits a print request with web authentication to the web service provider unit 111 of the print intermediary server 110. The print request with web authentication includes a printing apparatus ID, a print data URI, a web user ID, and a web user password. The communication of the print request with web authentication is performed, for example, by SOAP.

In step S2009, the web service provider unit 111 of the print intermediary server 110 receives the print request with web authentication from the web service requester unit 124 of the web application server 120. In step S2010, the web service requester unit 124 of the print intermediary server 110 calls the print job table management unit 114. The print job table management unit 114 stores the information of the print request with web authentication in the print job table 520 with web authentication.

Figure 11:
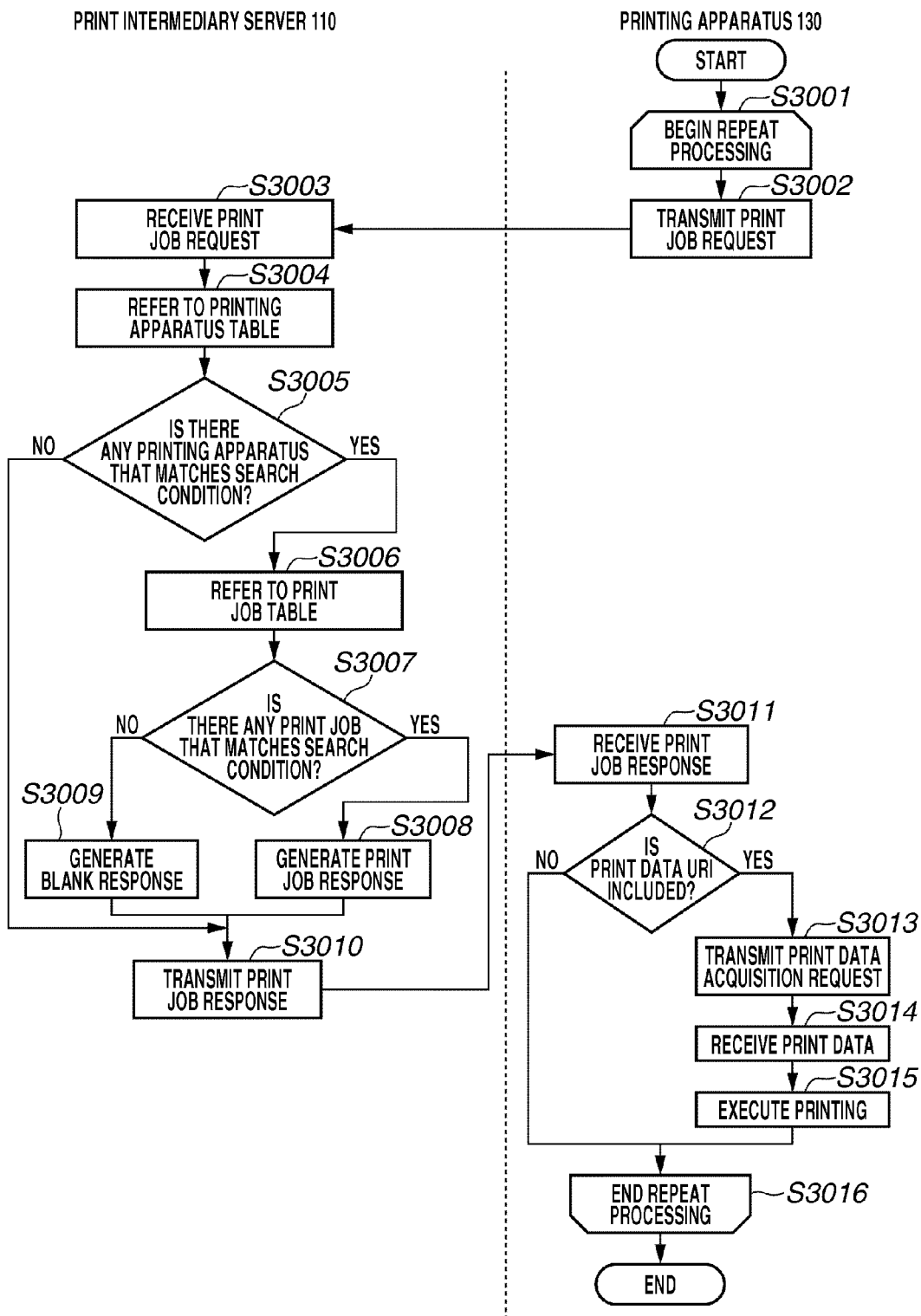
FIG. 11 illustrates a flow of the printing apparatus acquiring a print job from the print intermediary server and executing printing.

Since the processes in steps S3001 to S3007, steps S3009 to S3012, and steps S3014 to S3016 in FIG. 11 are similar to those of the first exemplary embodiment, their descriptions are not repeated.

In step S3008, the print job response generation unit 112 of the print intermediary server 110 calls the print job table management unit 114. The print job table management unit 114 acquires information of the print job from the print job table 520 with web authentication and sends the information to the print job response generation unit 112. Then, the print job response generation unit 112 generates a print job response with web authentication. The print job response includes a print data URI, a web user ID, and a web user password.

In step S3013, the web client 1302 of the printing apparatus 130 reads the print data URI, the web user ID, and the web user password from the print job. Next, the web client 1302 transmits a request for downloading the print data from the print data URI using the web user ID and the web user password.

As described above, if the download processing is performed according to the flowcharts in FIGS. 10 and 11, authentication with respect to the downloading of the print data by the printing apparatus 130 can be performed using the web application server 120. Thus, only the printing apparatus 130 that has received the printing instruction from the web application server 120 can download the print data.

Next, processing by the printing apparatus 130 for acquiring a print job from the print intermediary server 110 and performing printing if the user that has transmitted the print job is the user of the printing apparatus 130 will be described according to a third exemplary embodiment of the present invention. The present embodiment will be described with reference to the flowcharts in FIGS. 11 and 12, and also FIGS. 13 and 6C. In the following description, only the configurations different from those of the first exemplary embodiment will be described.

First, data of the print job table 530 with printing apparatus authentication managed by the print job table management unit 114 according to the present embodiment will be described with reference to FIG. 6C. The printing apparatus ID and the print data URI are similar to those described in the first exemplary embodiment. The row of data 531 indicates that a print job having "AAA" as the printing apparatus user ID and "xxxxxxx" as the printing apparatus user password is registered in the print job table 530 with printing apparatus authentication.

The row of data 532 indicates that a print job having "BBB" as the printing apparatus user ID and "xxxxxxx" as the printing apparatus user password is registered in the print job table 530 with printing apparatus authentication. The row of data 533 indicates that a print job having "CCC" as the printing apparatus user ID and "xxxxxxx" as the printing apparatus user password is registered in the print job table 530 with printing apparatus authentication. The above-described information can be registered in the print job table 530 with printing apparatus authentication according to the processing flow illustrated in FIG. 12.

Figure 12:
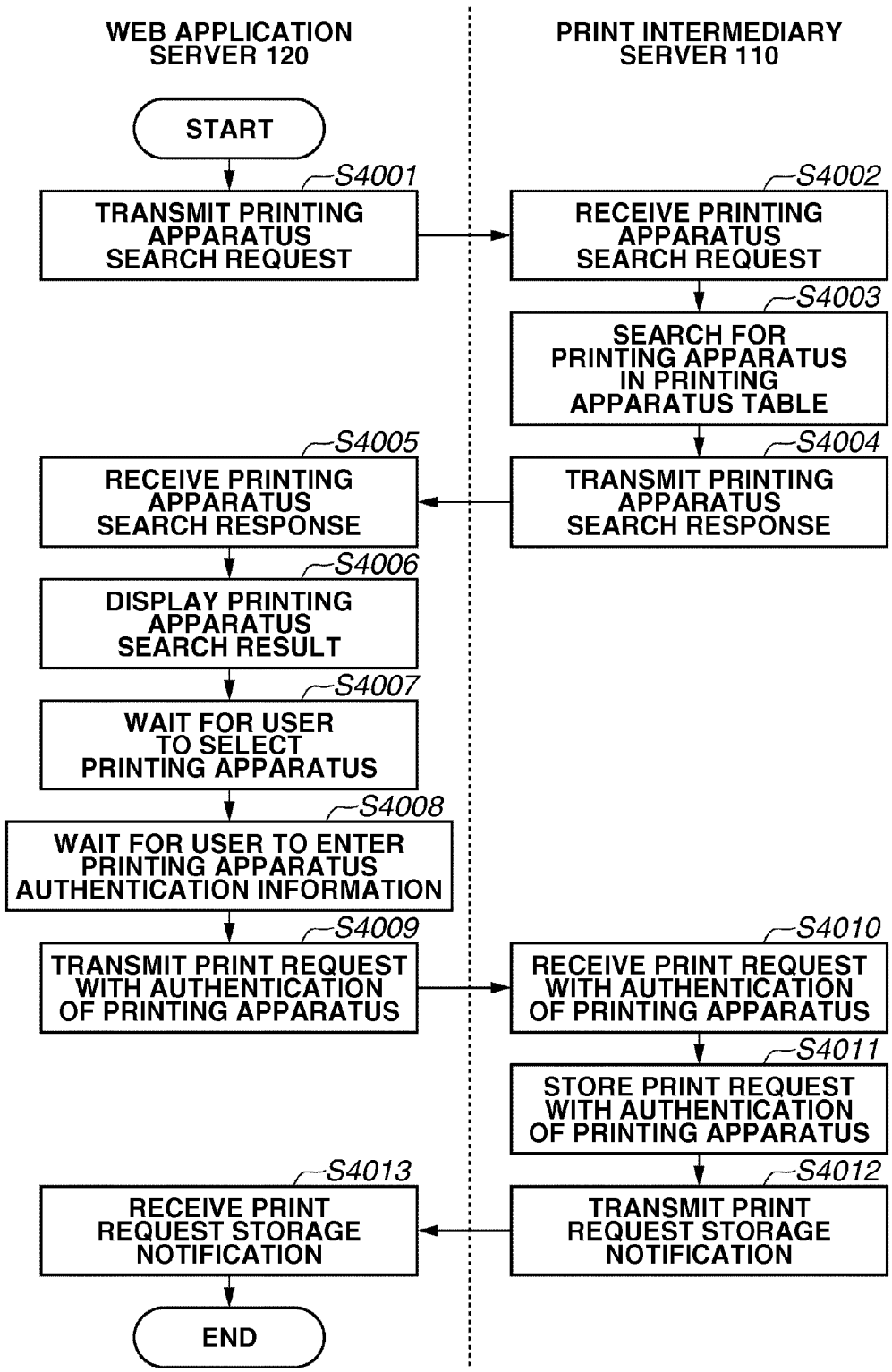
FIG. 12 illustrates a registration flow of a print request including a printing apparatus user ID and a printing apparatus user password sent from the web application server to the print intermediary server.

Since the processes performed in steps S4001 to S4007 in FIG. 12 are similar to those performed in steps S2001 to S2007 in FIG. 10, their descriptions are not repeated.

Figure 14:
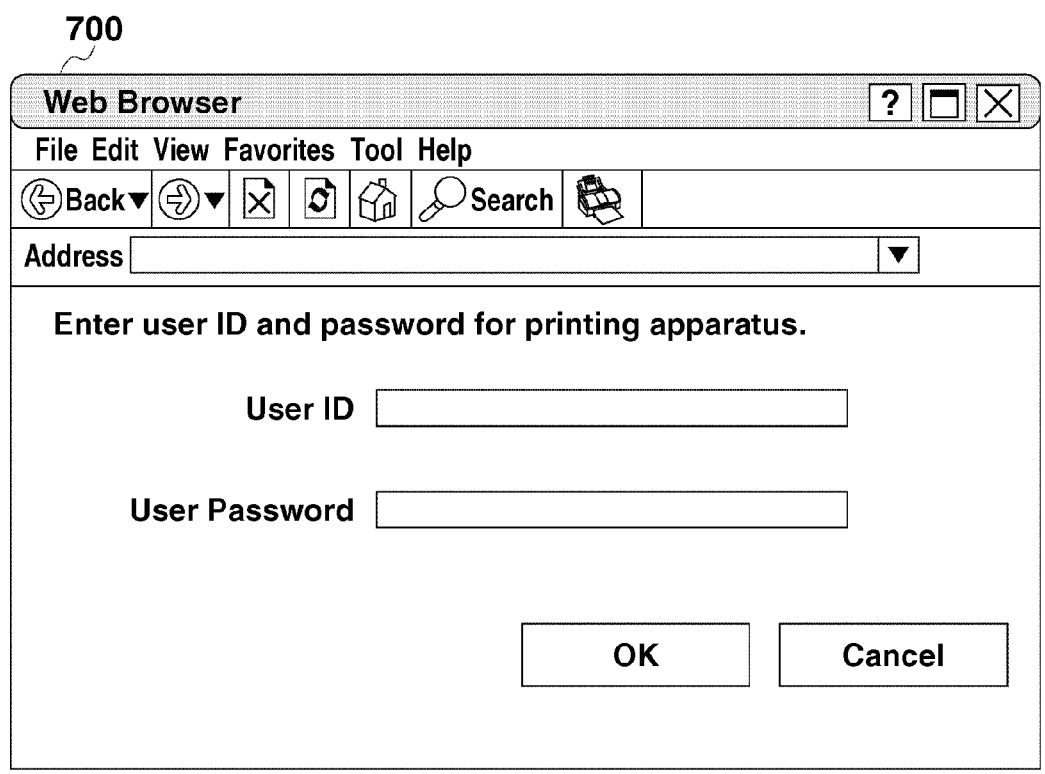
FIG. 14 illustrates an input screen of the printing apparatus used for entering the printing apparatus user ID and the printing apparatus user password.

In step S4008, the web server unit 121 of the web application server 120 displays a printing apparatus authentication information input screen 700 illustrated in FIG. 14 in the browser 141 of the host computer 140 and waits for the user to enter information. The printing apparatus authentication information includes a printing apparatus user ID and a printing apparatus user password managed by the authentication manager 137 of the printing apparatus 130. When the user enters the printing apparatus user ID and the printing apparatus user password, and further selects the OK button, the processing proceeds to step S4009.

In step S4009, the web service requester unit 124 of the web application server 120 transmits a print request with printing apparatus authentication to the web service provider unit 111 of the print intermediary server 110. The print request with printing apparatus authentication includes a printing apparatus ID, a print data URI, a printing apparatus user ID, and a printing apparatus password. The communication of the print request with printing apparatus authentication is performed, for example, by SOAP.

In step S4010, the web service provider unit 111 of the print intermediary server 110 receives the print request sent from the web service requester unit 124 of the web application server 120. In step S4011, the web service provider unit 111 of the print intermediary server 110 calls the print job table management unit 114. The print job table management unit 114 stores information of the print request with printing apparatus authentication in the print job table 530 with printing apparatus authentication.

In step S4012, the print intermediary server 110 transmits a print request storage notification to the web application server 120. In step S4013, the web application server 120 receives the print request storage notification from the print intermediary server 110.

Figure 13:
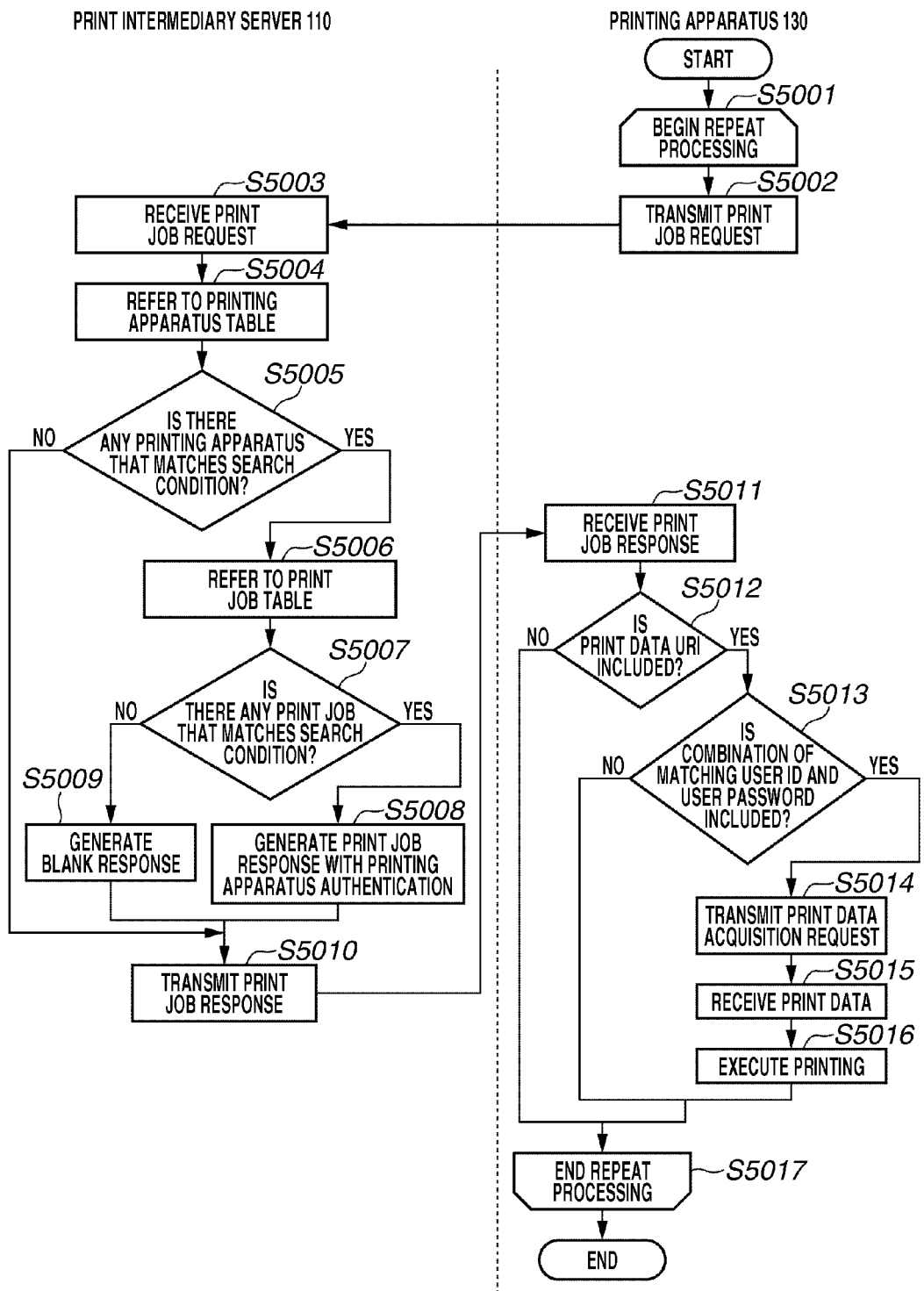
FIG. 13 illustrates a processing flow including acquisition of the print job by the printing apparatus sent from the print intermediary server, authentication, and execution of printing.

Next, the processing flow illustrated in FIG. 13 will be described. Since the processes performed in steps S5001 to S5007 in FIG. 13 are similar to those performed in steps S3001 to S3007 in FIG. 11, their descriptions are not repeated.

Further, since the processes performed in steps S5009 to S5012 and steps S5014 to S5016 are similar to those performed in steps S3009 to S3012 and steps S3014 to S3016 in FIG. 11, their descriptions are not repeated.

In step S5008, the print job response generation unit 112 of the print intermediary server 110 generates a print job response with printing apparatus authentication. The print job response with printing apparatus authentication includes a print data URI, a printing apparatus user ID, and a printing apparatus user password. In step S5009, the print intermediary server 110 generates a blank response. The blank response does not include a print data URI.

In step S5010, the print intermediary server 110 transmits the print job response generated in step S5008 or S5009 in response to the print job request transmitted from the printing apparatus 130. The communication of the print job response is performed, for example, by SOAP. In step S5011, the web client 1302 of the printing apparatus 130 receives the print job response transmitted from the web service provider unit 111 of the print intermediary server 110.

In step S5012, the printing apparatus 130 determines whether a print data URI is included in the print job response. Whether a print data URI is included in the response is determined, for example, by acquiring information in the XML of the SOAP communication. If a print data URI is included in the print job response (YES in step S5012), then the processing proceeds to step S5013. If the print data URI is not included (NO in step S5012), then the processing proceeds to step S5017.

In step S5013, the web client 1302 of the printing apparatus 130 reads the printing apparatus user ID and the printing apparatus user password from the print job response. Next, the web client 1302 calls the authentication manager 137 and performs the authentication. The authentication manager 137 determines whether a combination of the printing apparatus user ID and the printing apparatus user password exists, and returns the result to the web client 1302. If a combination of the printing apparatus user ID and the printing apparatus user password exists (YES in step S5013), then the processing proceeds to step S5014. If such a combination does not exist (NO in step S5013), then the processing proceeds to step S5017.

In step S5014, the web client 1302 of the printing apparatus 130 reads the print data URI from the print job and then requests the web server unit 121 of the web application server 120 to download the print data from the print data URI. In step S5015, the web client 1302 of the printing apparatus 130 downloads the print data from the print data URI with respect to the web server unit 121 of the web application server 120. The request for downloading the print data is performed according to, for example, an HTTP protocol Get request with respect to the print data URI.

In step S5016, the print manager 135 of the printing apparatus 130 prints the downloaded document using, for example, PDF direct print. As illustrated in FIG. 8, the PDF direct print is a function which allows direct printing of a PDF document without using a printer driver. The printing apparatus 130 is not necessarily capable of PDF direct print, and after the control API 1303 of the printing apparatus 130 converts the document into a print format which can be printed by the PDL manager 136, the document can be printed using the RIP 308.

In step S5017, the processing returns to step S5001.

As described above, if processing is performed according to the flowcharts in FIGS. 11 and 12, authentication that allows printing of the printing apparatus can be acquired. Thus, only the printing according to the printing instruction given by a user managed by the authentication manager 137 is executed.

Next, processing by the print intermediary server 110 for transmitting a redirect response concerning print data URI to the printing apparatus 130 as a print job response will be described with reference to the flowchart in FIG. 15 according to a fourth exemplary embodiment of the present invention. In the present embodiment, "redirect" means HTTP redirect.

The HTTP redirect is a function used for notifying the web client 1302 to acquire a resource from a URI different from the designated URI if the web client 1302 requests a resource from the web service provider unit 111. The web client 1302 interprets the notification of the redirect transmitted from the web service provider unit 111, and the request is redirected to the target URI. In the following description, only the configurations different from those of the first exemplary embodiment will be described.

Figure 15:
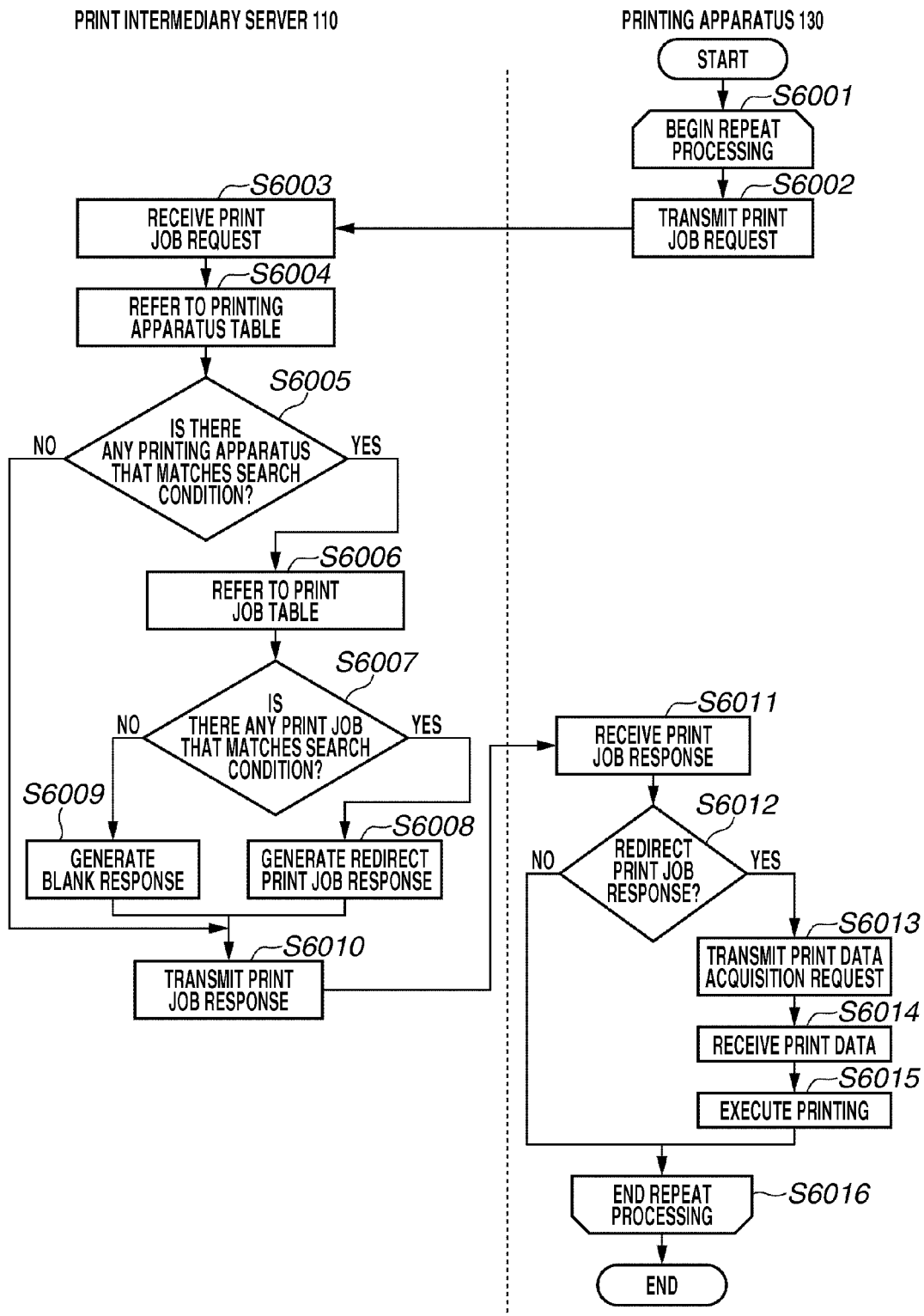
FIG. 15 illustrates a transmission flow of a redirect response to a print data uniform resource identifier (URI) as a print job response sent from the print intermediary server to the printing apparatus.

Since the processes performed in steps S6001 to S6007 in FIG. 15 are similar to those performed in steps S3001 to S3007 in FIG. 11, their descriptions are not repeated.

In step S6008, the redirect response generation unit 116 of the print intermediary server 110 generates a redirect response. A print data URI stored in the data management unit 123 of the web application server 120 is designated as the redirect URI.

On the other hand, in step S6009, the print intermediary server 110 generates a blank response. The blank response does not include the print data URI. In step S6010, the print intermediary server 110 transmits the print job response generated in step S6008 or S6009 in response to the print job request transmitted from the printing apparatus 130. The HTTP, for example, is used for the communication of the print job response.

In step S6011, the web client 1302 of the printing apparatus 130 receives the print job response transmitted from the web service provider unit 111 of the print intermediary server 110. In step S6012, the web client 1302 of the printing apparatus 130 determines whether the print job response is a redirect response according to the response given by the print intermediary server 110. If the response is a redirect response (YES in step S6012), the processing proceeds to step S6013. If the response is a blank response (NO in step S6012), the processing proceeds to step S6016.

The determination in step S6012 is performed by the web client 1302 based on the HTTP redirect response given by the print intermediary server 110. Since the processes performed in steps S6013 to S6016 are similar to those performed in steps S3013 to S3016 in FIG. 11, their descriptions are not repeated.

As described above, if the processing is performed according to the flowchart in FIG. 15, the printing apparatus 130 can download print data according to a redirect response given by the print intermediary server 110. Thus, the printing apparatus 130 can automatically execute the download processing of print data.

Next, a case where a redirect response including redirect of a URI to a URI generated by the print intermediary server 110 is given by the print intermediary server 110 to the printing apparatus 130 as a print job response according to a fifth exemplary embodiment of the present invention will be described with reference to the flowchart illustrated in FIG. 16. By adding a web user ID and a web user password regarding the web application server 120 to a print data URI, the print intermediary server can generate a redirect URI. In the following description, only the configurations different from those of the first exemplary embodiment will be described. Since the registration process of a print job with web authentication in the print job table with web authentication of the print intermediary server 110 is similar to the process described in the second exemplary embodiment 2, the description is not repeated.

Since the processes performed in steps S7001 to S7007, S7009 to S7011, and S7014 to S7016 in FIG. 16 are similar to those performed in steps S3001 to S3007, S3009 to S3011, and S3014 to S3016 in FIG. 11, their descriptions are not repeated.

In step S7008, the redirect response generation unit 116 of the print intermediary server 110 calls the logical URI generation unit 117. The logical URI generation unit 117 calls the print job table management unit 114. The print job table management unit 114 acquires information of the print job from the print job table 510 with web authentication and sends the acquired information to the logical URI generation unit 117. The logical URI generation unit generates a logical URI by adding a web user ID and a web user password to the print data URI. The logical URI for the row of data 521 in FIG. 5B will be generated as, for example, "http://test/print/document1.pdf/ABC/xxxxxxxx". The logical URI generation unit 117 sends the generated logical URI to the redirect response generation unit 116. Then, the redirect response generation unit 116 generates a redirect response for a logical URI.

In step S7012, the web client 1302 of the printing apparatus 130 determines whether the print job response given by the print intermediary server 110 is a redirect response. If the print job response is a redirect response (YES in step S7012), the processing proceeds to step S7013. If the print job response is a blank response (NO in step S7012), then the processing proceeds to step S7016. The processing in step S7012 is determined by the web client 1302 according to the HTTP redirect response given by the print intermediary server 110.

In step S7013, the web client 1302 of the printing apparatus 130 requests downloading of the print data from the logical URI. The web application server 120 acquires the web user ID and the web user password from the logical URI. The user ID and the web user password are authenticated by the authentication unit 125.

In step S7014, the web client 1302 of the printing apparatus 130 downloads the print data from the print data URI with respect to the web server unit 121 of the web application server 120. The download request of the print data is, for example, a Get request of the HTTP protocol with respect to the print data URI.

As described above, if processing is performed according to the flowchart in FIG. 16, the printing apparatus 130 can download print data according to the redirect response from the print intermediary server 110. Further, the web application server 120 can provide authentication when print data is downloaded from the printing apparatus 130. Thus, only the printing apparatus 130 that has received a printing instruction from the web application server 120 can download the print data.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-240867 filed Oct. 19, 2009, which is hereby incorporated by reference herein in its entirety.

What is claimed is:

1. A print intermediary server capable of communicating with a web application server and a printing apparatus via the Internet, the print intermediary server comprising:
   a management unit configured to manage information of one or more printing apparatuses;
   a response unit configured to search information of a printing apparatus requested by the web application server out of the information of one or more printing apparatuses managed by the management unit and to generate a response to the web application server;
   a storage unit configured to associate location information indicating a storage location of print data whose printing has been requested by the web application server, device information indicating a printing apparatus which has been requested to perform printing, and authentication information necessary for the printing apparatus to access the web application and to store the associated information as a print job; and
   a generation unit configured to extract, in response to a print job request from the printing apparatus, a print job associated with the printing apparatus which has made the print job request out of the print jobs stored in the storage unit, and to generate a print job response to be transmitted to the printing apparatus, the print job response including logical location information which includes the location information with the authentication information.

2. The print intermediary server according to claim 1, wherein the storage unit further stores authentication information for the web application server which has requested printing, and wherein the generation unit adds, in response to the print job request from the printing apparatus, the authentication information to the print job and transmits the print job to the printing apparatus.

3. The print intermediary server according to claim 1, wherein the storage unit further stores authentication information for the printing apparatus sent from the web application server, and wherein the generation unit adds, in response to the print job request from the printing apparatus, the authentication information for the printing apparatus to the print job and generates a print job with authentication.

4. The print intermediary server according to claim 1, wherein the generation unit extracts, in response to the print job request from the printing apparatus, a print job of the printing apparatus which has made the print job request out of the print jobs stored in the storage, and generates a redirect response for a storage location of the print data.

5. The print intermediary server according to claim 4, wherein the generation unit generates the redirect response including authentication information for the web application server added to information indicating the storage location of the print data.

6. A print intermediary method for a print intermediary server capable of communicating with a web application server and a printing apparatus via the Internet, the print intermediary method comprising:
   managing information of one or more printing apparatuses;
   searching information of a printing apparatus requested by the web application server out of the managed information of one or more printing apparatuses and generating a response to the web application server;
   associating location information indicating a storage location of print data whose printing has been requested by the web application server, device information indicating a printing apparatus which has been requested to perform printing, and authentication information necessary for the printing apparatus to access the web application, and storing the associated information as a print job; and
   extracting, in response to a print job request from the printing apparatus, a print job associated with the printing apparatus which has made the print job request out of the stored print jobs, and generating a print job response to be transmitted to the printing apparatus, the print job response including logical location information which includes the location information with the authentication information.

7. A non-transitory computer-readable storage medium storing a program for causing a computer to execute the print intermediary method according to claim 6.

* * * * *